(12) United States Patent
Kim

(10) Patent No.: US 12,113,757 B2
(45) Date of Patent: Oct. 8, 2024

(54) RECEIVING DEVICE AND METHOD FOR PROCESSING ATTENTION MESSAGE

(71) Applicant: SAMSUNG SDS CO., LTD., Seoul (KR)

(72) Inventor: Hyunwook Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/338,709

(22) Filed: Jun. 21, 2023

(65) Prior Publication Data

US 2024/0098044 A1 Mar. 21, 2024

(30) Foreign Application Priority Data

Sep. 15, 2022 (KR) .......................... 10-2022-0116553

(51) Int. Cl.
*G06F 15/16* (2006.01)
*G06F 3/0482* (2013.01)
*H04L 51/04* (2022.01)
*H04L 51/224* (2022.01)

(52) U.S. Cl.
CPC ............ *H04L 51/04* (2013.01); *G06F 3/0482* (2013.01); *H04L 51/224* (2022.05)

(58) Field of Classification Search
CPC ..... H04L 51/04; H04L 51/224; G04L 51/224; G06F 3/0482
USPC .................. 709/206, 204, 207, 203
See application file for complete search history.

(56) References Cited

U.S. PATENT DOCUMENTS

| | | | | |
|---|---|---|---|---|
| 5,493,692 A * | 2/1996 | Theimer | ............... | H04L 51/226 455/26.1 |
| 7,124,167 B1 * | 10/2006 | Bellotti | ................. | H04L 67/306 455/461 |
| 11,620,041 B1 * | 4/2023 | Boucheron | ........... | H04L 65/403 715/758 |
| 2002/0103005 A1 * | 8/2002 | Watts, Jr. | ............... | G06F 16/273 455/556.2 |

(Continued)

FOREIGN PATENT DOCUMENTS

| | | |
|---|---|---|
| EP | 2 632 132 A1 | 8/2013 |
| KR | 10-2019-0070219 | 6/2019 |
| WO | WO 2021/184720 A1 | 9/2021 |

OTHER PUBLICATIONS

European Office Action issued on Feb. 20, 2024, in counterpart European Patent Application No. 23 184 403.6 (5 pages).

*Primary Examiner* — Kaylee J Huang
(74) *Attorney, Agent, or Firm* — NSIP Law

(57) ABSTRACT

A receiving device for processing an attention message, the receiving device includes a transmitting/receiving module configured to receive a message, a control module configured to determine whether the received message is an attention message, and to set an attention display flag, and an input/output module configured to display the attention indicator in the chat room in response to the set attention display flag. The message includes an ID of the chat room, an ID of the transmitting device, an ID of the first user, a type of the message, a content of the message, and a transmission time. The control module is configured to determine, based on at least one of the type of the message, the content of the message, and the transmission time, whether the message is the attention message.

19 Claims, 5 Drawing Sheets

(56) References Cited

U.S. PATENT DOCUMENTS

| | | | |
|---|---|---|---|
| 2002/0194502 A1* | 12/2002 | Sheth | G06F 16/954 |
| | | | 726/4 |
| 2005/0198096 A1* | 9/2005 | Shaffer | H04L 65/1094 |
| | | | 709/200 |
| 2006/0195533 A1* | 8/2006 | Isozaki | G06Q 10/107 |
| | | | 709/206 |
| 2007/0156886 A1* | 7/2007 | Srivastava | H04L 51/212 |
| | | | 709/224 |
| 2012/0196575 A1* | 8/2012 | Hymel | H04M 3/42042 |
| | | | 455/412.2 |
| 2015/0312182 A1* | 10/2015 | Langholz | G06F 3/04842 |
| | | | 715/753 |
| 2017/0264582 A1* | 9/2017 | Chase | H04L 51/04 |
| 2018/0341387 A1* | 11/2018 | Segal | H04L 51/04 |
| 2020/0014641 A1* | 1/2020 | Kwon | H04L 51/216 |

* cited by examiner

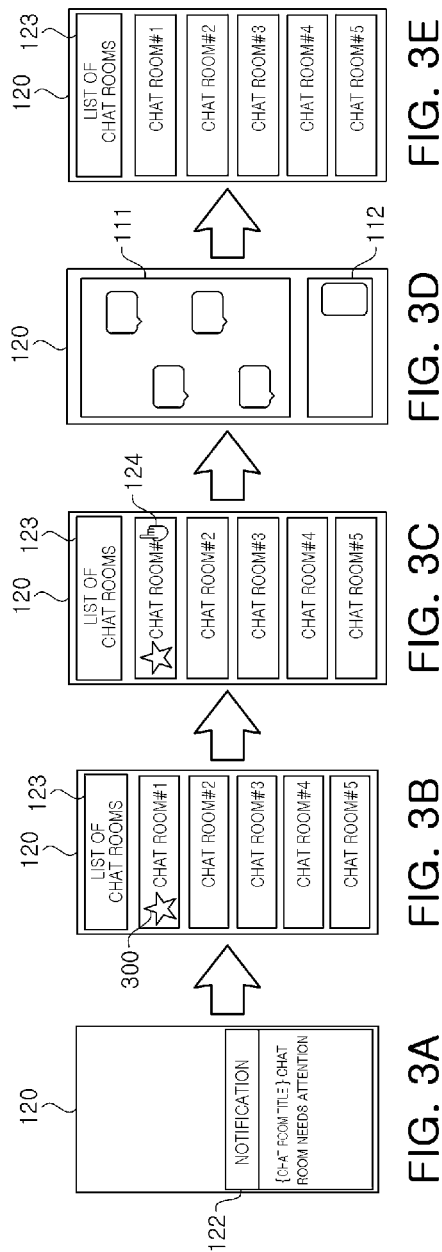

RECEIVING DEVICE AND METHOD FOR PROCESSING ATTENTION MESSAGE

CROSS-REFERENCE TO RELATED APPLICATIONS

This application claims benefit of priority to Korean Patent Application No. 10-2022-0116553 filed on Sep. 15, 2022 in the Korean Intellectual Property Office, the disclosure of which is incorporated herein by reference in its entirety.

BACKGROUND

1. Field

The present disclosure relates to a receiving device and method for processing an attention message.

2. Description of Related Art

A messenger program is a program allowing messages to be simply transmitted and received over a network. That is, once a user transmitting a message and at least one user receiving the message are determined, the message may be transmitted and received via a chat room including the determined participants.

When such a messenger program is used, it often happens that a user sends a message via a chat room and waits for a response from a counterpart, but the messaging counterpart may be unable to respond immediately due to work or other reasons and forget to make a response.

Therefore, in order to solve the above-described issue, a solution capable of attracting the attention of the messaging counterpart is required, and a new protocol therefor needs to be defined.

SUMMARY

In one general aspect, a receiving device for processing an attention message includes: one or more processors; memory storing instructions configured to cause the one or more processors to: receive a message via a network, the message being a chat message transmitted from a transmitting device operated by a first user and directed to a second user in a chat room in which the first user and the second user participate; determine that the received message is an attention-specific message specifically for instructing display of an attention indicator in a user interface of the chat room; respond to determining that the received message is an attention-specific message by setting an attention display flag in the memory, the attention display flag being a flag indicating that the attention indicator is to be displayed; and display the attention indicator in the user interface of the chat room based on attention display flag having been set, wherein the message includes an ID of the chat room, an ID of the transmitting device, an ID of the first user, a type indicator indicating a type of the message, a content of the message, and a time of the message, and wherein the determining whether the message is an attention-specification message in based on the type indicator of the message, the content of the message, or the transmission time.

The instructions may be further configured to cause the one or more processors to determine that the message is an attention-specific message based on a value in the type indicator of the message having a predefined value indicating an attention-specific message, the content of the message being blank, or the transmission time being an invalid time value.

The user interface may include a list of interactively selectable chat room indicators indicating respective chat rooms and selectable to activate the respective chat rooms, wherein the attention indicator comprises a pre-designated special character or a pre-designated figure, and wherein the attention indicator is displayed in association with the interactively selectable chat room indicator corresponding to the chat room associated with the message.

The instructions may be further configured to cause the one or more processors to: reset the attention display flag when confirmation input of the second user for the chat room is completed; and based on the resetting of the attention display flag, cause the attention indicator to not be displayed in association with the chat room user interface element.

The message may be a message generated and transmitted responsive to a predetermined operation invoked by an input of the first user directed to a user interface of the chat room that is displayed by the transmitting device, and the input of the first user is a shaking of the transmitting device or a touching of a screen of the transmitting device with at least two or more fingers for a preset period of time.

The message may be transmitted from the transmitting device to the receiving device via a server, and the server is configured to determine that the message is an attention-specific message and, based thereon, transmit the message to the receiving device only when determined that the second user is logged on to the server.

The instructions may be further configured to cause the one or more processors to render a notification through a notification framework of the receiving device in response to determining that the received message is an attention-specific message.

Based on the message being an attention-specific message, the message may not be stored, as a chat message of the chat room, in the transmitting device, the receiving device, and/or the server.

In another general aspect, a method for processing an attention message includes: receiving, via a network, by a receiving device, a message, the message being a message transmitted from a transmitting device operated by a first user to a receiving device operated by a second user, wherein a chat room to which the message is directed includes the first user and the second user as participants; determining, by the receiving device, whether the received message is an attention-specific message for instructing display of an attention indicator in association with the chat room; responsive to determining that the message is an attention-specific message, setting an attention display flag, the attention display flag being a flag controlling whether the attention indicator is displayed; based on the attention display flag being set, displaying the attention indicator in a user interface of the chat room, wherein the message includes an ID of the chat room, an ID of the transmitting device, an ID of the first user, a type indicator indicating a type of the message, a content of the message, and a message time of the message; and wherein the determining whether the message is an attention-specific message is based on the type indicator of the message, the content of the message, or the transmission time.

The determining whether the message is an attention-specification message may be based on the type indicator having a predefined value corresponding to attention-specific messages, the content of the message being blank, or the transmission time being an invalid time value.

The user interface may comprise interactively selectable representations of respective chat rooms including the chat room, and wherein the attention indicator is displayed in association with the representation of the chat room, and wherein the attention indicator comprises a pre-designated special character or a pre-designated figure.

The method may further include: resetting the attention display flag responsive to a confirmation input of the second user; and causing the attention indicator to not be displayed based on the resetting of the attention display flag.

The method may further include configuring the message to indicate that it is an attention-specific message responsive to an input operation of the first user that is performed while the transmitting device is displaying a second user interface of the chat room, and the input operation may include shaking the transmitting device or touching a screen of the transmitting device with at least two or more fingers for a preset period of time.

The message may be transmitted from the transmitting device to the receiving device via a server.

The server may be configured to transmit the message to the receiving device based on determining that the message is an attention-specific message and based on the second user being logged on to the server.

The method may further include displaying a notification, separate from the chat room, based on determining that the received message is an attention-specific message.

Based on the message being an attention-specific message, the message may be not stored, in association the chat room, in the transmitting device, the receiving device, and the server.

The attention-specific message may be not displayed as a chat message among chat messages of the chat room displayed by the receiving device and by the transmitting device.

The message may be sent according to a same chat messaging protocol according to which chat messages of the chat room are exchanged between the transmitting device and the receiving device, and wherein the message and the chat messages conform with the chat messaging protocol.

BRIEF DESCRIPTION OF THE DRAWINGS

The above and other aspects, features, and advantages of the present disclosure will be more clearly understood from the following detailed description, taken in conjunction with the accompanying drawings, in which:

FIGS. 3A-3E illustrate a screen displayed on a receiving device receiving an attention message according to an example embodiment of the present disclosure;

DETAILED DESCRIPTION

Figure 1:
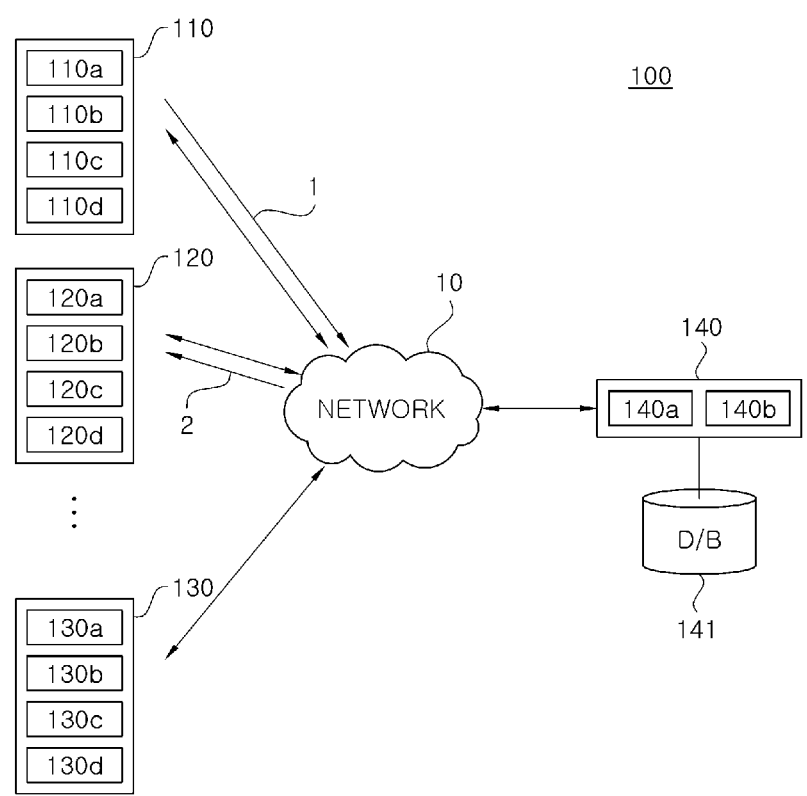
FIG. 1 is a configuration diagram illustrating a system including a receiving device for processing an attention message according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, example embodiments of the present disclosure will be described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

FIG. 1 is a configuration diagram illustrating a system including a receiving device for processing an attention message according to an example embodiment of the present disclosure. A system 100 may include a transmitting device 110, receiving devices 120 and 130, and a server 140 having a database (D/B) 141. The transmitting device 110, the receiving devices 120 and 130, and the server 140 may be interconnected via a network 10.

In the present disclosure, a chat room may refer to a virtual space in which users are able to transmit and receive messages, and may be based on a concept including both a personal chat room in which only two users participate and a group chat room in which three or more people participate.

When the chat room is a personal chat room, one first user and one second user may be present. In this case, the first user may refer to a user of the transmitting device 110, and the second user may refer to a user of the receiving device 120.

Conversely, when the chat room is a group chat room, one first user and two or more second users may be present. In this case, the first user may refer to a user of the transmitting device 110, and the second user may refer to a user of the receiving device 120 and a user of the receiving device 130, respectively.

Hereinafter, for easier understanding of the present disclosure, it may be assumed that the chat room is a personal chat room, the first user refers to a user of the transmitting device 110, and the second user refers to a user of the receiving device 120.

Hereinafter, operations of the transmitting device 110, the receiving devices 120 and 130, and the server 140 of the system 100 will be described with reference to FIG. 1.

As illustrated in FIG. 1, the transmitting device 110 may include an input/output module 110a, a control module 110b, a transmitting/receiving module 110c, and a memory 110d.

Specifically, the input/output module 110a of the transmitting device 110 may be a module, receiving a content (for example, text) of a message from the first user. The input/output module 110a may include, for example, a keyboard, a mouse, and a touch panel.

The control module 110b of the transmitting device 110 may generate a message including a content input via the input/output module 110a, and may transmit the generated message 1 to the server 140 via the transmitting/receiving module 110c. The transmitting/receiving module 110c (and the others described herein) may be any one of, or any combination of, a cellular network interface (radio), a wireless network interface (e.g., a WiFi interface), a network interface card (NIC), or similar devices for wired and/or wireless network communication. Here, the message may include various items, that is, an ID (IDentifier) of a chat room in which the first user participates, an ID of the transmitting device 110, an ID of the first user, a type of the message, a content of the message, and a transmission time.

In particular, according to an example embodiment of the present disclosure, information indicating that the message is an attention message may be included in some items of the message described above.

As an example, the control module 110b may indicate that the message is an attention message by inserting a predefined value for the attention message into the type of the message.

As an example, the control module 110b may indicate that the message is an attention message by leaving the content of the message blank.

As an example, the control module 110b may indicate that the message is an attention message by inserting an invalid time into the transmission time. That is, when the transmission time of the message is, for example, 10:20, an invalid time such as "0" may be inserted instead of 10:20, a valid time.

That is, the control module 110b may indicate that the message is an attention message via at least one of the message type, message content, and transmission time described above.

Figures 2A, 2B, 2C:
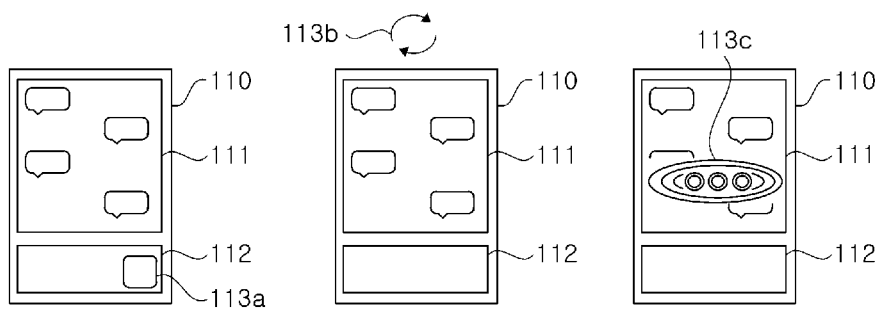
FIGS. 2A-2C illustrate an operation of a user for generating an attention message in a transmitting device according to an example embodiment of the present disclosure.

FIGS. 2A-2C illustrate an operation of a user for generating an attention message in a transmitting device according to an example embodiment of the present disclosure. In FIG. 2, reference numeral 111 indicates a state in which a chat room is opened, reference numeral 112 indicates a text input field, reference numeral 113a indicates an attention button, reference numeral 113b indicates an operation of a first user shaking the transmitting device 110, and reference numeral 113c indicates an operation of a first user touching a screen with at least two or more fingers for a preset period of time.

As illustrated in FIGS. 2A-2C, the attention message may be generated when a predetermined operation by the first user is performed in a state 111 in which a chat room of the transmitting device 110 is opened. Here, the predetermined operation may include an operation 113b of shaking the transmitting device 110 or an operation 113c of touching a screen of the transmitting device 110 with at least two fingers for a preset period of time. The preset period of time may be appropriately selected, as necessary.

As an example, as illustrated in FIG. 2A, the control module 110b of the transmitting device 110 may generate the above-described attention message, when the first user clicks the attention button 113a in the state 111 in which the chat room is opened.

Alternatively, as illustrated in FIG. 2B, the control module 110b of the transmitting device 110 may generate the above-described attention message, when the first user performs the operation 113b of shaking the transmitting device 110 in the state 111 in which the chat room is opened.

Alternatively, as illustrated in FIG. 2C, the control module 110b of the transmitting device 110 may generate the above-described attention message, when the operation 113c of touching the screen with at least two or more fingers is performed for a preset period of time in the state 111 in which the chat room is opened. The preset period of time may be appropriately set, as necessary.

It should be noted that specific examples of the predetermined operations described above are intended to assist in understanding of the present disclosure, and are not limited to the above-described examples.

Thereafter, the transmitting/receiving module 110c of the transmitting device 110 may transmit the generated message 1 to the server 140 via the network 10.

An application for the above-described chat room may be loaded and executed in the memory 110d of the transmitting device 110.

The server 140 may include a transmitting/receiving module 140a and a control module 140b.

Specifically, the transmitting/receiving module 140a of the server 140 may receive a message 2 from the transmitting device 110 via the network 10, and may transmit the received message to the device 120.

In addition, the control module 140b of the server 140 may control the transmitting/receiving module 140a to transmit/receive a message.

The server 140 may have a database (D/B) 141. In the database (D/B) 141, IDs of a chat room, an ID of a user participating in each chat room ID, a device ID of the user, a type of a message, a content of the message, and a transmission time may be stored.

That is, when a message is received from the first user, the control module 140b of the server 140 may transmit the message to the second user participating in the chat room with reference to the database (D/B) 141.

In addition, according to an example embodiment of the present disclosure, the database (D/B) 141 may further store a log-in state of the server 140 for each user. In this case, the control module 140b of the server 140 may transmit the attention message only while the second user is logged on to the server 140, thereby reducing message pollution. In this case, the server 140 may need to be able to determine whether the message is an attention message (a method of determining an attention message will be described below in relation to a receiving device).

In addition, the above-described attention message may not be stored in the receiving device 120, the transmitting device 110, and/or the server 140, thereby reducing message pollution.

That is, the receiving device 120 may not separately store the received message after determining whether the message is an attention message, the transmitting device 110 may not separately store the attention message after transmitting the attention message, and/or the server 140 may also not separately store the attention message after transmitting the attention message.

The receiving device 120 may include an input/output module 120a, a control module 120b, a transmitting/receiving module 120c, and a memory 120d. The other device 130 may include an input/output module 130a, a control module 130b, a transmitting/receiving module 130c, and a memory 130d. When the device 130 receives the attention message from the first user, the device 130 may perform an operation the same as that of the receiving device 120. Hereinafter, the receiving device 120 will be mainly described.

First, the transmitting/receiving module 120c of the receiving device 120 may receive a message 2 from the server 140 and transmit the received message 2 to a control module 120b to be described below.

Subsequently, the control module 120b of the receiving device 120 may determine whether the received message is an attention message. As a result of the determination, when the message is an attention message, an attention display flag may be set. The attention display flag may be stored in a memory 120d to be described below.

Here, the above-described attention message may be a message for instructing display of an attention indicator in the chat room so as to attract the attention of the second user. The attention message may not be stored in the above-described transmitting device 110, server 140, and receiving device 120, thereby reducing message pollution. The above-described attention display flag may be a flag indicating whether the attention indicator is displayed.

Specifically, the control module 120b may determine, based on at least one of a type of a message among messages, a content of the message, and a transmission time, whether the received message is an attention message.

For example, the control module 120b may determine that the received message is an attention message, when a predefined value for the attention message is inserted into the type of the message.

Alternatively, the control module 120b may determine that the received message is an attention message when the content of the message is blank.

Alternatively, the control module 120b may determine that the received message is an attention message when the transmission time is an invalid time.

Thereafter, when the received message is an attention message, the control module 120b may set the attention display flag.

Finally, the input/output module 120a of the receiving device 120 may be a module displaying the content of messages received from the second user via the chat room. The input/output module 120a may include, for example, a keyboard, a mouse, a touch panel, and the like.

In particular, the input/output module 120a may also display/render the attention indicator in the chat room in response to the attention display flag. Here, the attention indicator may include a pre-designated special character or a pre-designated figure displayed in a chat room among a list of chat rooms.

FIGS. 3A-3E illustrate a screen displayed on a receiving device receiving an attention message according to an example embodiment of the present disclosure.

According to an example embodiment of the present disclosure, as illustrated in FIG. 3A, when a received message is determined as an attention message, the input/output module 120a may first output a notification 122. A content of the notification 122 may be, for example, "The chat room needs attention", but it should be noted that the content of the notification 122 is not necessarily limited to such a phrase. The notification may be displayed by a notification framework of the receiving device 120, e.g., apart from the user interface or activity of the messaging application.

Thereafter, as illustrated in FIG. 3B, the input/output module 120a may display an attention indicator in a chat room in which a first user is participating, among a list of chat rooms 123.

FIG. 3B illustrates a plurality of chat rooms (chat rooms #1 to #5) in which a second user using the receiving device 120 is participating. It may be assumed that the first user and the second user are participating in chat room #1 among the plurality of chat rooms (chat rooms #1 to #5), and an attention message sent by the first user is for chat room #1. Accordingly, in this case, the input/output module 120a may display an attention indicator 300 in the chat room #1.

As illustrated in FIG. 3B, the attention indicator 300 may be a pre-designated figure, for example, a star, but may also be other pre-designated special characters. The attention indicator 300 may by displayed on any of various user interface elements indicating respective chat rooms, where the user interface elements are interactively selectable to display the corresponding chat rooms.

Subsequently, as illustrated in FIG. 3C, when chat room #1 with the attention indicator displayed is clicked (124), chat room #1 may be opened, as illustrated in FIG. 3D, such that confirmation of the second user may be completed. Thereafter, the control module 120b may reset an attention display flag. As illustrated in FIG. 3E, the input/output module 120a may delete, in response to the reset the attention display flag, the attention indicator displayed in chat room #1 from the list of chat rooms 123.

An application for the above-described chat room may be loaded and executed in the memory 120d of the receiving device 120. In particular, according to an example embodiment of the present disclosure, the attention display flag for the chat room may be stored in the above-described memory 120d. In this case, an initial value of the attention display flag may be configured to be reset, and may be configured to be reset when the second user logs out of the server 140 or when the second user completes confirming the chat room. Accordingly, when the second user relogs in to the server 140 after logging out of the server 140 or opens a chat room for the first time, all chat rooms in which the second user is participating may not have an attention indicator (e.g., as a default configuration).

In the present disclosure, the transmitting device 110 and the receiving devices 120 and 130 may include, for example, a smartphone, a mobile phone, a laptop computer, a digital broadcasting terminal, a personal digital assistant (PDA), a portable multimedia player (PMP), a tablet PC, and the like.

As described above, according to an example embodiment of the present disclosure, whether a received message is an attention message may be determined. When the received message is an attention message, an attention indicator may be displayed in a chat room, thereby attracting the attention of a counterpart.

In addition, according to an example embodiment of the present disclosure, a specific item of a transmitted message, that is, at least one of a type of the message, a content of the message, and a transmission time may be as an item for an attention message, thereby defining a new protocol for the attention message.

In addition, according to an example embodiment of the present disclosure, the attention message may be allowed to be transmitted when a predetermined operation by a user, for example, an operation of shaking a transmitting device or touching a screen of the transmitting device with at least two or more fingers for a preset period of time, is performed in a state in which a chat room of the transmitting device is opened, thereby greatly simplifying the transmission of the attention message.

In addition, according to an example embodiment of the present disclosure, the attention message may be received only while a user of a receiving device is logged on to a server, and the attention message may not be stored in the receiving device, the transmitting device, and/or the server, thereby reducing message pollution.

Figure 4:
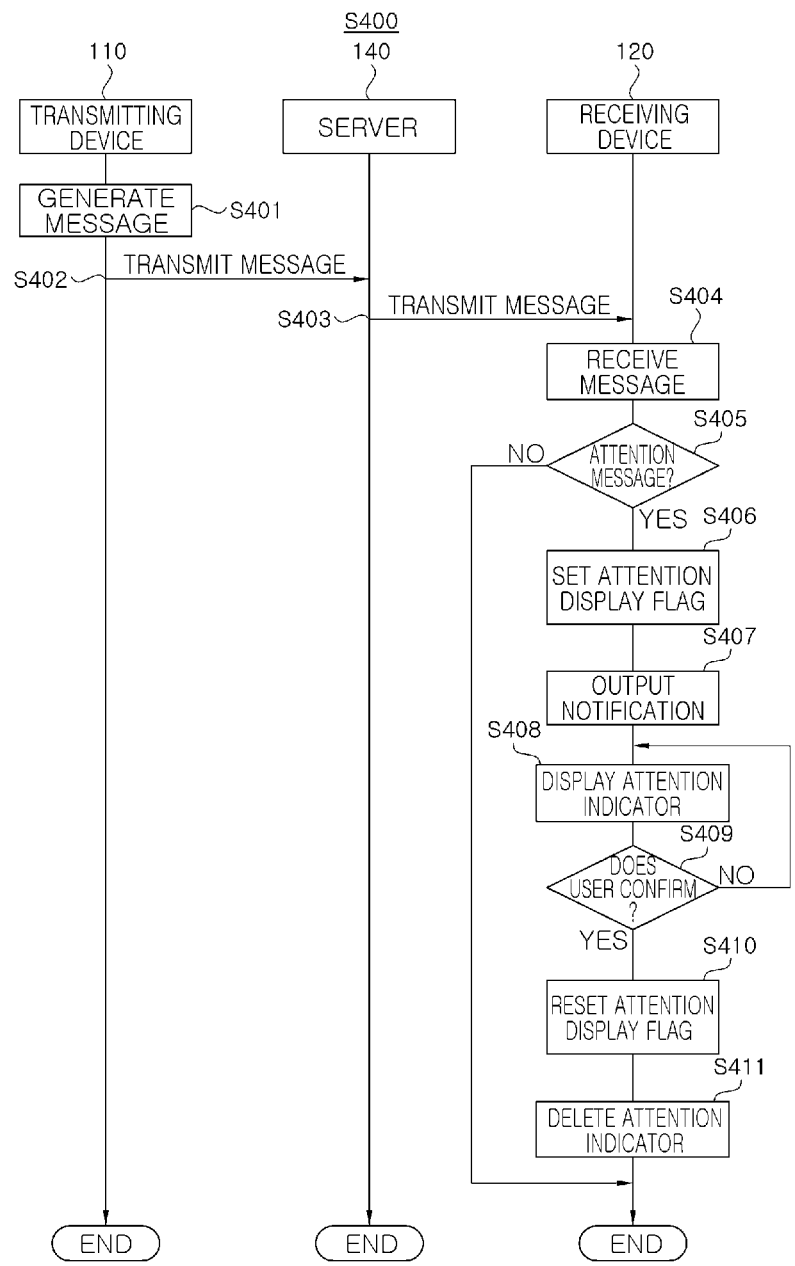
FIG. 4 is a flowchart illustrating a method for processing an attention message according to an example embodiment of the present disclosure.

FIG. 4 is a flowchart illustrating a method for processing an attention message according to an example embodiment of the present disclosure.

Hereinafter, a method (S400) for processing an attention message according to an example embodiment of the present disclosure will be described with reference to FIGS. 1 to 4. However, a description overlapping those of FIGS. 1 to 3 will be omitted for simplicity of the disclosure.

First, referring to FIGS. 1 to 4, the method (S400) for processing an attention message according to an example embodiment of the present disclosure may be started by generating, by the transmitting device 110, a message (S401). The generated message may be transmitted to the server 140 (S402). Thereafter, the server 140 may transmit the received message to the receiving device 120 (S403). In this case, as described above, the server 140 may transmit an attention message to the receiving device 120 only while a second user is logged on to the server 140.

Here, the message may include various items, that is, an ID (IDentifier) of a chat room in which a first user participates, an ID of the transmitting device 110, an ID of the first user, a type of message, a content of the message, and a transmission time. In particular, as described above, according to an example embodiment of the present disclosure, some items of the above-described message may include information indicating that the message is an attention message.

As an example, the control module 110b may insert a predefined value for the attention message into the type of the message, leave the content of the message blank, or insert an invalid time into the transmission time, thereby indicating that the message is an attention message.

That is, the control module 110b may indicate that the message is an attention message via at least one of the message type, message content, and transmission time described above.

In addition, the attention message may be generated when a predetermined operation by the first user is performed in a state in which a chat room of the transmitting device 110 is opened (111), and the predetermined operation may include an operation 113b of shaking the transmitting device 110 or an operation 113c of touching a screen of the transmitting device 110 with at least two fingers for a preset period of time, as described above.

Thereafter, the receiving device 120 may receive a message 2 from the server 140 (S404).

Subsequently, the receiving device 120 may determine whether the received message is an attention message (S405). Here, the above-described attention message may be a message for instructing display of an attention indicator in a chat room in order to attract the attention of the second user, and the above-described attention display flag may be a flag indicating whether to display the attention indicator, as described above.

Specifically, the receiving device 120 may determine, based on at least one of a type of a message among messages, a content of the message, and a transmission time, whether the received message is an attention message.

For example, the control module 120b may determine that the received message is an attention message, when a predefined value for the attention message is inserted into the type of the message.

Alternatively, the control module 120b may determine that the received message is an attention message, when the content of the message is blank.

Alternatively, as described above, the control module 120b may determine that the received message is an attention message, when the transmission time is an invalid time.

Thereafter, when the received message is an attention message, the receiving device 120 may set the attention display flag (S406).

In addition, when the received message is an attention message, the receiving device 120 may first output a notification 122 (S407).

Subsequently, the receiving device 120 may display an attention indicator in the chat room in response to the attention display flag (S408). As described above, the attention indicator may include a pre-designated special character or a pre-designated figure displayed in a chat room among a list of chat rooms.

Thereafter, the receiving device 120 may determine whether the chat room with the attention indicator is displayed is confirmed by the second user (S408). As a result of the determination, when confirmation by the second user is completed, the attention display flag may be reset (S410), and accordingly, the attention indicator of the chat room may be deleted (S411).

As described above, according to an example embodiment of the present disclosure, whether a received message is an attention message may be determined. When the received message is an attention message, an attention indicator may be displayed in a chat room, thereby attracting the attention of a counterpart.

In addition, according to an example embodiment of the present disclosure, a specific item of a transmitted message, that is, at least one of a type of the message, a content of the message, and a transmission time may be as an item for an attention message, thereby defining a new protocol for the attention message.

In addition, according to an example embodiment of the present disclosure, the attention message may be allowed to be transmitted when a predetermined operation by a user, for example, an operation of shaking a transmitting device or touching a screen of the transmitting device with at least two or more fingers for a preset period of time, is performed in a state in which a chat room of the transmitting device is opened, thereby greatly simplifying the transmission of the attention message.

In addition, according to an example embodiment of the present disclosure, an attention message may be received only while a user of a receiving device is logged on to a server, and the attention message may not be stored in the receiving device, the transmitting device, and the server, thereby reducing message pollution.

Figure 5:
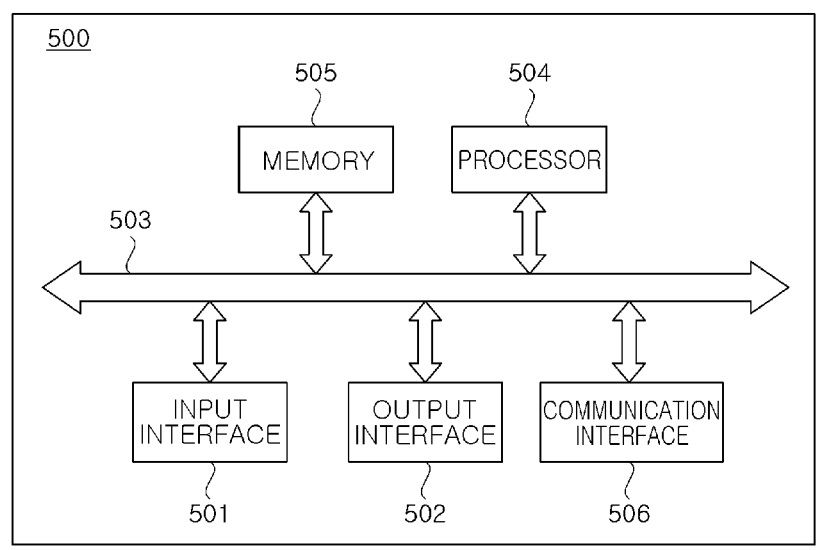
FIG. 5 is a block diagram illustrating a computer device capable of fully or partially implementing a receiving device according to an example embodiment of the present disclosure.

FIG. 5 is a block diagram illustrating a computer device capable of fully or partially implementing a receiving device according to an example embodiment of the present disclosure, and may be applied to the transmitting device 110, the receiving devices 120 and 130, and server 140 illustrated in FIG. 1.

As illustrated in FIG. 5, a computer device 500 may include an input interface 501, an output interface 502, a processor 504, a memory 505, and a communication interface 506, and the input interface 501, the output interface 502, the processor 504, the memory 505, and the communication interface 506 may be interconnected via a system bus 503.

In an example embodiment of the present disclosure, the memory 505 may be used to store programs, instructions or codes, and the processor 504 may execute the programs, instructions or codes stored in the memory 505, may control the input interface 501 to receive signals, and may control the output interface 502 to transmit signals. The above-described memory 505 may include read-only memory and random access memory, and may provide instructions and data to the processor 504.

In an example embodiment of the present disclosure, the processor 504 may be a central processing unit (CPU), and may be understood as being another general-purpose processor, a digital signal processor (DSP), an application specific integrated circuit (ASIC), a field programmable gate array (FPGA) or another programmable logic device, an individual gate or transistor logic device, an individual hardware component, or the like. A general-purpose processor may be a microprocessor, or the processor may be any processor according to the related art or the like.

In an implementation, the method performed by respective devices 110, 120, 130, and 140 of FIG. 4 may be accomplished by an integrated logic circuit of hardware in the processor 404 or an instruction in the form of software. The method disclosed with respect to example embodiments of the present disclosure may be performed and completed by a hardware processor, or may be performed and completed by a combination of hardware in the processor and a software module. The software module may be disposed in a storage medium such as random access memory, flash memory, read-only memory, programmable read-only memory, or electrically erasable programmable memory, a register, or the like. The storage medium may be positioned in the memory 505. The processor 504 may read information in the memory 505, and may implement the above-described method in combination with hardware. In order to avoid redundancy, a detailed description will be omitted herein.

While example embodiments have been illustrated and described above, it will be apparent to those skilled in the art that modifications and variations could be made without departing from the scope of the present disclosure as defined by the appended claims.

The computing apparatuses, the servers, the electronic devices, the processors, the memories, the displays, the information output system and hardware, the storage devices, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A receiving device for processing an attention message, the receiving device comprising:
one or more processors configured to execute instructions;
a memory storing the instructions, wherein the execution of the instructions by the one or more processors configures the one or more processors to:
receive a message via a network, the message being a chat message transmitted from a transmitting device operated by a first user and directed to a second user in a chat room in which the first user and the second user participate;
determine that the received message is an attention-specific message specifically for instructing display of an attention indicator in a user interface of the chat room;
respond to determining that the received message is an attention-specific message by setting an attention display flag in the memory, the attention display flag being a flag indicating that the attention indicator is to be displayed; and
display the attention indicator in the user interface of the chat room based on attention display flag having been set, wherein the message includes an ID of the chat room, an ID of the transmitting device, an ID of the first user, a type indicator indicating a type of the message, a content of the message, and a time of the message, and wherein the determining whether the message is an attention-specification message in based on the type indicator of the message, the content of the message, or a transmission time.

2. The receiving device of claim 1, wherein the instructions are further configured to cause the one or more processors to determine that the message is an attention-specific message based on a value in the type indicator of the message having a predefined value indicating an attention-specific message, the content of the message being blank, or the transmission time being an invalid time value.

3. The receiving device of claim 1, wherein the user interface includes a list of interactively selectable chat room indicators indicating respective chat rooms and selectable to activate the respective chat rooms, wherein the attention indicator comprises a pre-designated special character or a pre-designated figure, and wherein the attention indicator is displayed in association with the interactively selectable chat room indicator corresponding to the chat room associated with the message.

4. The receiving device of claim 1, wherein the instructions are further configured to cause the one or more processors to:

reset the attention display flag when confirmation input of the second user for the chat room is completed; and based on the resetting of the attention display flag, cause the attention indicator to not be displayed in association with a chat room user interface element.

5. The receiving device of claim 1, wherein the message is a message generated and transmitted responsive to a predetermined operation invoked by an input of the first user directed to a user interface of the chat room that is displayed by the transmitting device, and the input of the first user is a shaking of the transmitting device or a touching of a screen of the transmitting device with at least two or more fingers for a preset period of time.

6. The receiving device of claim 1, wherein the message is transmitted from the transmitting device to the receiving device via a server, and the server is configured to determine that the message is an attention-specific message and, based thereon, transmit the message to the receiving device only when determined that the second user is logged on to the server.

7. The receiving device of claim 6, wherein, based on the message being an attention-specific message, the message is not stored, as a chat message of the chat room, in the transmitting device, the receiving device, and/or the server.

8. The receiving device of claim 1, wherein the instructions are further configured to cause the one or more processors to render a notification through a notification framework of the receiving device in response to determining that the received message is an attention-specific message.

9. A method for processing an attention message, the method comprising:

receiving, via a network, by a first receiving device, a message, the message being a message transmitted from a transmitting device operated by a first user to a second receiving device operated by a second user, wherein a chat room to which the message is directed includes the first user and the second user as participants;

determining, by the first receiving device, whether the received message is an attention-specific message for instructing display of an attention indicator in association with the chat room;

responsive to determining that the message is an attention-specific message, setting an attention display flag, the attention display flag being a flag controlling whether the attention indicator is displayed; and based on the attention display flag being set, displaying the attention indicator in a user interface of the chat room, wherein the message includes an ID of the chat room, an ID of the transmitting device, an ID of the first user, a type indicator indicating a type of the message, a content of the message, and a message time of the message; and, wherein the determining whether the message is an attention-specific message is based on the type indicator of the message, the content of the message, or the transmission time.

10. The method of claim 9, wherein the determining whether the message is an attention-specification message is based on the type indicator having a predefined value corresponding to attention-specific messages, the content of the message being blank, or the transmission time being an invalid time value.

11. The method of claim 9, wherein the user interface comprises interactively selectable representations of respective chat rooms including the chat room, and wherein the attention indicator is displayed in association with the representation of the chat room, and wherein the attention indicator comprises a pre-designated special character or a pre-designated figure.

12. The method of claim 9, further comprising:

resetting the attention display flag responsive to a confirmation input of the second user; and causing the attention indicator to not be displayed based on the resetting of the attention display flag.

13. The method of claim 9, further comprising:

configuring the message to indicate that it is an attention-specific message responsive to an input operation of the first user that is performed while the transmitting device is displaying a second user interface of the chat room, and wherein the input operation comprises shaking the transmitting device or touching a screen of the transmitting device with at least two or more fingers for a preset period of time.

14. The method of claim 9, wherein the message is transmitted from the transmitting device to the first receiving device via a server.

15. The method of claim 14, wherein the server is configured to transmit the message to the first receiving device based on determining that the message is an attention-specific message and based on the second user being logged on to the server.

16. The method of claim 15, wherein, based on the message being an attention-specific message, the message is not stored, in association the chat room, in the transmitting device, the receiving first device, and the server.

17. The method of claim 16, wherein the attention-specific message is not displayed as a chat message among chat messages of the chat room displayed by the first receiving device and by the transmitting device.

18. The method of claim 17, wherein the message is sent according to a same chat messaging protocol according to which chat messages of the chat room are exchanged between the transmitting device and the first receiving device, and wherein the message and the chat messages conform with the chat messaging protocol.

19. The method of claim 9, further comprising displaying a notification, separate from the chat room, based on determining that the received message is an attention-specific message.

* * * * *